United States Patent [19]

Sief et al.

[11] Patent Number: 5,731,589
[45] Date of Patent: Mar. 24, 1998

[54] ULTRAVIOLET RADIATION DOSIMETER

[75] Inventors: Rolf Sief, Dortmund; Petra Rettberg, Essen; Gerda Horneck, Bendorf, all of Germany

[73] Assignee: Deutsche Forschungsanstalt fur Luft-und Raumfahrt e.V., Bonn, Germany

[21] Appl. No.: 717,165

[22] Filed: Sep. 20, 1996

[30] Foreign Application Priority Data

Sep. 22, 1995 [DE] Germany ............ 195 35 273.4

[51] Int. Cl.$^6$ ............................................. G01T 1/08
[52] U.S. Cl. ................................ 250/482.1; 250/475.2
[58] Field of Search ...................... 250/472.1, 475.2, 250/482.1

[56] References Cited

U.S. PATENT DOCUMENTS 2,902,602  9/1959  Chessende-Baroz .......... 250/472.1
5,371,004  12/1994  Quintern.

FOREIGN PATENT DOCUMENTS 8711714.2  1/1988  Germany.
4233001  4/1994  Germany.
4317405  12/1994  Germany.
9318377  9/1993  WIPO.

OTHER PUBLICATIONS

L.E. Quintern, et al., "A Biofilm Used as Ultraviolet-Dosimeter", Photochemistry and Photobiology, vol. 55, No. 3, pp. 389–395, 1992.

L.E. Quintern, et al., "Continuous dosimetry of the biologically harmful UV–radiation in Antartica with the biofilm technique", J. Photochem. Photobiol. B: Biol., 22 (1994) 59–66.

*Primary Examiner*—Carolyn E. Fields
*Attorney, Agent, or Firm*—Loeb & Loeb LLP

[57] ABSTRACT

The invention relates to a radiation dosimeter comprising a sensor arranged in a dosimeter casing and including at least one measuring field and a calibrating zone (64). To provide a dosimeter which can be readily manufactured and comprises a wide measuring range with high precision, it is provided, according to the invention, that the calibrating zone (64) of the sensor (56) is inserted into a radiation-shielded clearance (66) of a double-wall element (68) being formed by folding a radiation-proof web-like material.

19 Claims, 3 Drawing Sheets

ULTRAVIOLET RADIATION DOSIMETER

BACKGROUND OF THE INVENTION

The invention relates to a radiation dosimeter.

Since human beings and other organisms as well as many materials are sensitive to radiation, dosimeters have been developed in order to measure the radiation stress. Recently, the public has become aware of sun radiation in particular.

Sun radiation can both be favorable to health, e.g., by stimulating the synthesis of vitamin D, and dangerous thereto, the development of skin cancer being the most serious late sequela of excessive sun influence. The ultraviolet portion of the sun rays, briefly the UV rays, play a decisive part therein. In recent years, a drastic increase in skin cancer diseases has been observed, which is partly explicable by an increased UV exposure, e.g., due to a modified leisure and social behavior of wide sections of the population. Additionally, a further increase in the risk of skin cancer is expected with the increasing dwindling of the stratospheric ozone layer, since the portion of the particularly dangerous UVB rays will increase thereby. Apart from the natural UV radiation of the sun, man is additionally—intentionally or unintentionally so—exposed to various artificial UV radiation sources such as during welding operations, under halogen lamps at work, when using UV radiation apparatuses.

To discover the causal connections between UV radiation and skin cancer diseases, a quantification of the UV exposure of both the population in general and selected risk groups is required. Up to now, mainly two methods have been used to detect the UV exposure of population groups: epidemiologic or demographic analysis by means of inquiries and person dosimetry. Epidemiologic and demographic analyses based on inquiries give a survey of the average UV exposure of selected population groups, e.g., depending on profession, leisure and vacation or in connection with certain diseases. Thus, they are used as basis data for estimating the risk of skin cancer, for example, as a consequence of UV exposure. In epidemiologic or demographic analyses based on inquiries, however, great mistakes may occur. These mistakes are due to incomplete statements, since it is very difficult, if not impossible, to remember the personal UV exposure over an extended period of time, possibly back to childhood, or due to a different individual rating of the intensity of the UV exposure.

Since the orientation of these persons to the UV radiation source usually changes continuously, measurements made directly at the body, e.g., by means of person dosimeters, present a better solution.

Generally, the sensors in person dosimeters are housed in light small frames which can be pinned on, so that they can be secured to various spots on the body without any difficulty. Therefor, polysulphone films are often used as UV-sensitive sensors. Here, the measuring principle is based on a UV-dependent increase in absorption of the radiation at the wavelength of 330 nm, which is photometrically detected.

Further, WO 93/18377 describes a UV-sensitive layer of a mercurous silver(I) oxalate sol in a highly polymerized gel applied on a paper or plastic support by means of a standard photographic method. The UV-sensitive reaction is based on a redox process and results in an irreversible staining (browning) of the layer. By means of a supplemented scale, the limit values of the UV exposure reached for the different skin types can be read from the degree of staining.

Moreover, German Patent 40 39 002 describes a UV-sensitive film for detecting radiation by immobilized microorganisms.

Further, German Gebrauchsmuster 87 11 714.2 describes a device for determining the radiation intensity, comprising a phototropic glass as a sensor which is covered by a detachable neutral and spectral filter. The measuring principle is based on a reversible graying of the phototropic glass in dependence on the radiation intensity, the gray tone being compared with a supplemented gray scale.

Further UV person dosimeters are described in DE-A-42 33 001 and DE-A-43 17 405, which use photoelectronic receivers as UV sensors. They permit an on-line detection of the radiation intensity. Upon reaching a predetermined limit value, a signal can be outputted.

As to the chemical or optoelectronic sensors used in person dosimetry so far, the spectral sensitivity differs from the wavelength sensitivity of the biologic effect, e.g., different skin cancer types or the erythema, by more than one order of magnitude. To obtain a statement about the carcinogenic power of the UV exposure, extensive correcting calculations are necessary. Therefor, a knowledge about the solar spectral radiation intensity, e.g., from spectroradiometric measurements, is required. This actually cannot be done since the spectral radiation intensity continuously varies with moving persons and depends on the position of the observed irradiated surface. Besides, most person dosimeters include only a very restricted dynamic range, and mostly, different wavelength regions cannot be differed.

SUMMARY OF THE INVENTION

It is the object of the present invention to provide an easily manufacturable UV radiation dosimeter with a wide measuring range and high precision on the basis of a UV-sensitive film for detecting radiation by immobilized microorganisms.

This object is solved, according to the invention, with the features of claim 1.

The arrangement of the double-wall element of sheet-like material ensures that the calibrating zones, prior to calibration, are shielded against the radiation in the region to be analyzed so that a further intensity range is covered and various wavelength regions can be considered. Nevertheless, the manufacturing effort for the radiation dosimeter is neglectable, since the double-wall element is easy to manufacture and the attachment of the sensor can also be performed with minor efforts.

Preferably, the dosimeter is used for receiving personal biologically weighted UV measuring data, in short, as a biological UV person dosimeter, and comprises, in this case, a dosimeter housing with a measuring field mask and an exchangeable dosimeter stack. The measuring field mask permits to simultaneously register different UV ranges, e.g., UVA, UVB or UVA+B, as well as different intensities. Thereby, the dynamic range of the sensor is enlarged. In the dosimeter stack, the sensor is arranged under an entrance optics.

As a sensor, a biofilm is preferably used which comprises a coated support layer and whose spectral sensitivity is in good correspondence with the erythema spectrum over wide ranges in the UVA and UVB range, the deviation comprising a factor smaller than factor 2.

By means of a punching method, the biofilm is configured such that it consists of two layers, i.e., an upper measuring zone comprising measuring fields, and a calibrating zone arranged thereunder, which is always obscured. After exposure, calibration and development, the biofilm is evaluated by means of an image analysis method. In doing so, the individual biologically effective UV dose is obtained in SI units (J/m$^2$).

The entrance optics having a large aperture angle consists of various layers of optical filters arranged such that the incident sunlight is differently filtered for each measuring field through the restricted measurement field mask. Combinations of the following optical filters are provided therefor; e.g., tissue-equivalent polymer as epidermis analogue to simulate the weakening of the UV radiation by the upper epidermis layer which is located above the cells responsible for the possible cancer development; and/or plastic sheets as cut-off filters or narrow-band filters to detect the biological power of defined wavelength regions of the ultraviolet sun radiation; and/or plastic sheets or gauze as neutral filters to expand the dynamic range of the measurement. The dosimeter stack is welded into an optically transparent waterproof plastic sheet and loosely placed in the dosimeter housing in this state.

All parts of the biological UV person dosimeter consist of light non-splintering biocompatible plastic materials having a high resistance against weather influences. Due to its small size (about 4×5 cm) and its low weight (about 10 g), it distinguishes itself by its high wearing comfort. By means of a steel clip or a band, it can be easily secured at different spots on the body of the experimentee.

An advantage of the biological UV person dosimeter over the methods for detecting the UV exposure of population groups used so far lies primarily in the fact that the individual biologically weighted UV radiation can be directly detected. No further correcting calculations or spectroradiometric measurements are necessary to obtain the biologically weighted UV measuring data, and it is possible to make a statement on the biologically effective radiation at that spot of the skin which is most decisive for skin cancer, which is in the lower epidermis cells (basal layer), and a statement on the proportional biological power of different spectral ranges of the solar UV radiation. At the same time, a large dynamic measurement range is available so that the dosimeter stack can be exchanged after predetermined periods of time, independent of the individual sun radiation. The small size in spite of the numerous measuring fields and the low weight ensure a high wearing comfort. Moreover, the dosimeter stack can be easily exchanged and is weather-resistant and waterproof.

Further advantageous embodiments and developments of the invention become apparent from the dependent claims and the drawing in conjunction with the description relating to a particularly preferred embodiment.

DESCRIPTION OF THE PREFERRED EMBODIMENT

Figure 1:
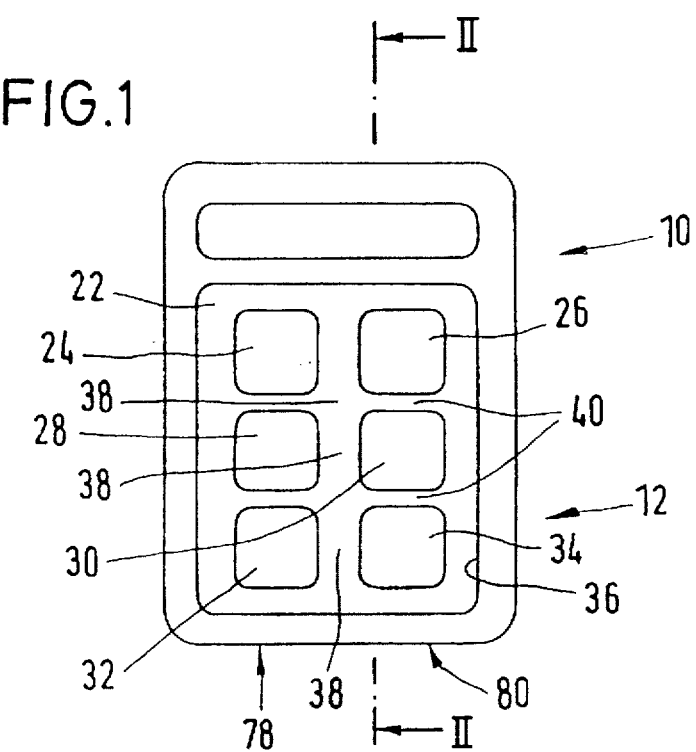
FIG. 1 shows a radiation dosimeter according to the invention in top view.
Figure 2:
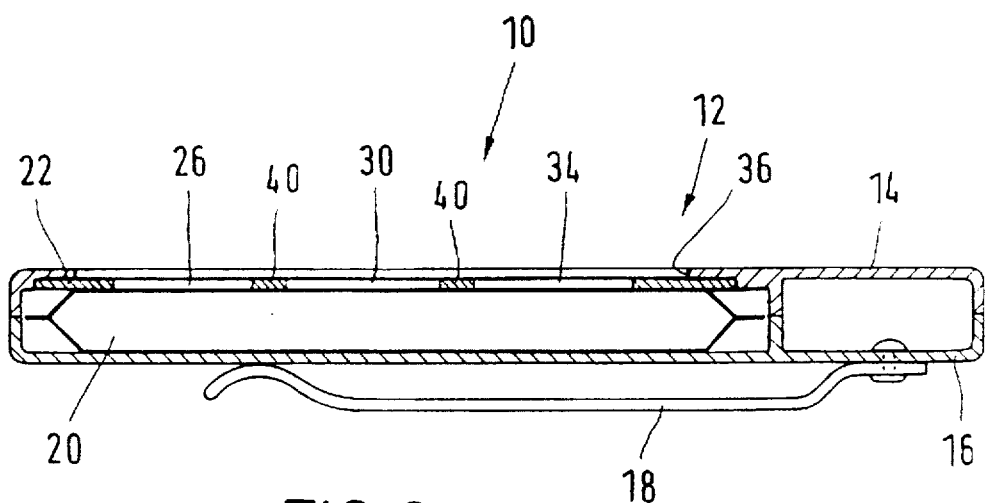
FIG. 2 shows the radiation dosimeter of FIG. 1 in section along line II—II in FIG. 1.
Figure 3:
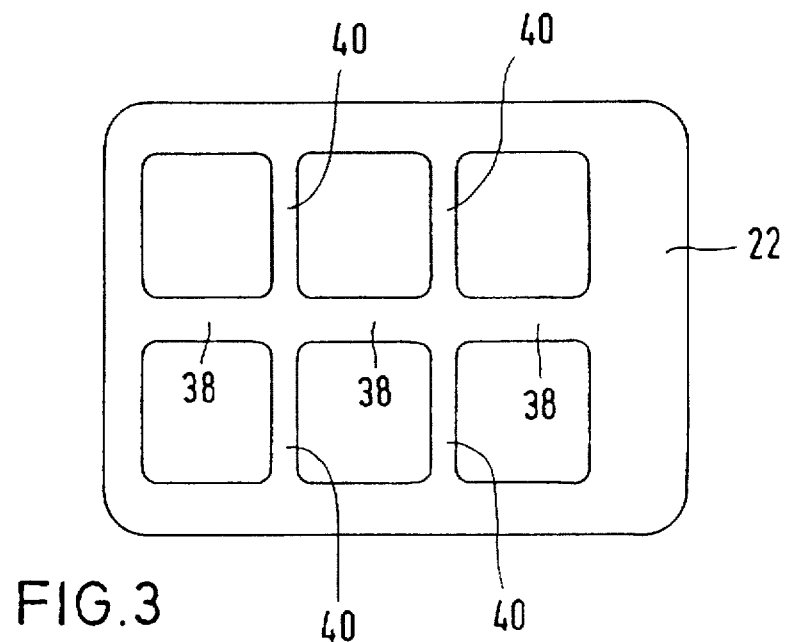
FIG. 3 shows a measuring field mask of the radiation dosimeter in FIG. 1.

The radiation dosimeter 10 comprises a housing 12 made of a rigid plastic material, which consists of an upper housing half 14 and a lower housing half 16. A dosimeter stack 20 is laid into the dosimeter housing 12 provided with a holding clip 18 at its under-side, the dosimeter stack 20 being located below a measuring field mask 22 arranged in the dosimeter housing 12. The measuring field mask 22 limits measuring fields 24,26,28,30,32,34 on the dosimeter stack 20.

The dosimeter housing 12 consists of a dosimeter film cartridge, the lower housing half 16 being a dosimeter bottom with the dimensions 52.5×41.5×7.5 mm. The upper housing half 14 is a dosimeter cover with a window 36 with the dimensions 36.5×29.5 mm. The measuring field mask 22 consisting of PVC is pressed into this window 36. Each of the six measuring fields 24,26,28,30,32,34 limited by the measuring field mask 22 has a size of 10.0×10.0 mm and they are spaced-apart by 3.5 and 2.0 mm, respectively. The width of the webs 38,40 formed between the measuring fields 24,26,28,30,32,34 is chosen such that the individual measuring fields 24,26,28,30,32,34 are limited with respect to each other even if the light is obliquely incident.

Figure 4:
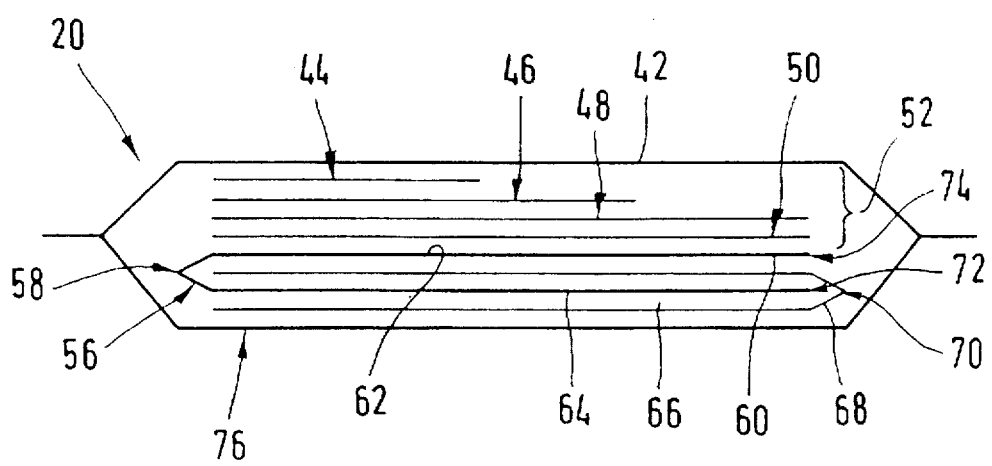
FIG. 4 shows a dosimeter stack of the radiation dosimeter in FIG. 1.
Figure 5:
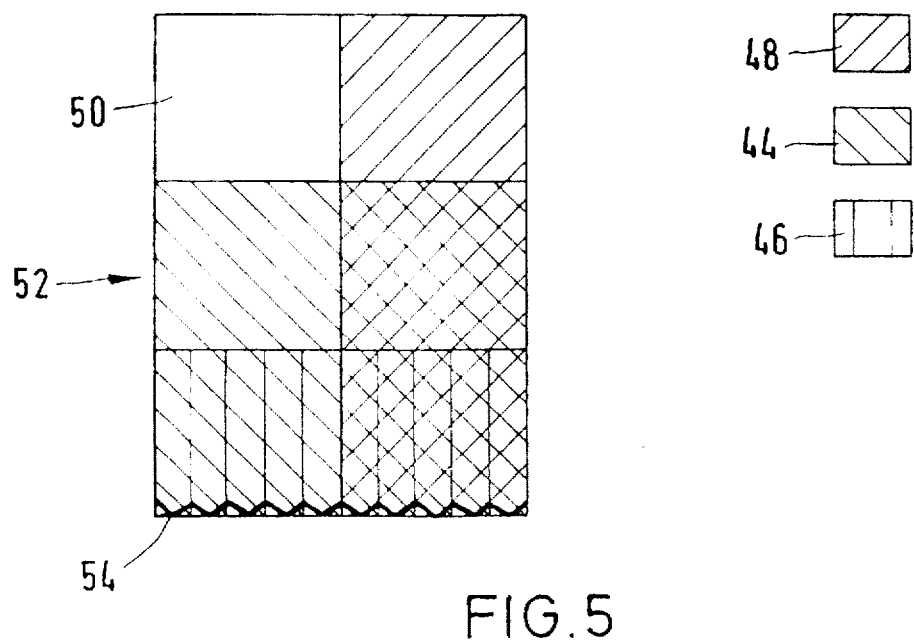
FIG. 5 is a diagrammatic representation for illustrating the filter combination of the dosimeter stack in FIG. 4.

The dosimeter stack 20 shown in FIG. 4 includes the different components of the radiation dosimeter 10 configured as a biological UV person dosimeter. The dosimeter stack 20 covering a base surface of 40×28 mm is loosely laid into the dosimeter housing 12 and can be exchanged after each measuring process. The dosimeter stack 20 is composed of the following layers overlaying each other at least partially, the outermost layer being a protective sheet 42 of waterproof polyethylene which directly faces the radiation. Below the protective sheet 42, a first neutral filter 44 and a second neutral filter 46 are arranged, consisting of polyamide gauzes and effecting an intensity reduction for enlarging the measuring range. Below the two neutral filters 44,46, a polyester sheet is provided as a cut-off filter 48 which filters out UV light above a certain wavelength. Below the cut-off filter, a polypeptide and/or keratin layer is provided as an epidermis analogue 50. The polyamide gauze serving as neutral filter 44,46 is available under the trademark NYTREL, and the polyester sheet serving as cut-off filter 48 is available under the trademark MYLAR. The neutral filters 44,46, the cut-off filter 48 and the epidermis analogue 50 form a filter combination 52 which is shown from above in FIG. 5. At one side, the individual layers of the filter combination 52 are connected by a weld seam 54.

Arranged below the filter arrangement 52 is the sensor 56 consisting of a biofilm 60 folded transversely to its longitudinal extension along a folding edge 58 and comprising a measuring zone 62 including the measuring fields 24,26,28, 30,32,34 and a calibrating zone 64 arranged under the measuring zone in parallel thereto. The calibrating zone 64 is located in a radiation-shielded clearance 66 of a double-wall element 68, said double-wall element being formed of web-like lightproof cardboard 68 being folded transversely to its longitudinal extension along a folding edge 70, said folding edge extending in parallel to the folding edge 58, but along the free edges 72,74 of the biofilm. A protective sheet 76 corresponding to the protective sheet 42 also forms the under-side of the dosimeter stack 20, the two protective sheets 42,76 being welded to each other at their contact seam.

The filters 44,46,48,50 are selected such that the measurement fields 24,28,32 form an UVA measuring row 78 and the measuring fields 26,30,34 arranged parallel thereto form an UVA+B-measuring row 80.

Figure 6:
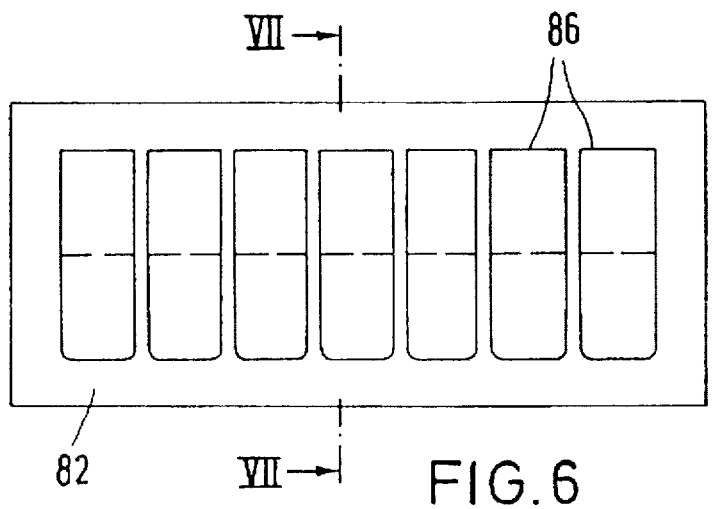
FIG. 6 shows a cutting inset for a punching machine in top view.
Figure 7:
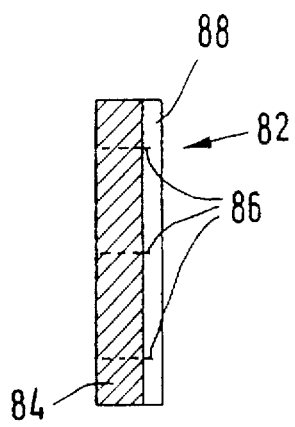
FIG. 7 is a cross-sectional view of the cutting inset in FIG. 6 along line VII—VII in FIG. 6.

The working steps for manufacturing the dosimeter stack are as follows:

First, the biofilm insert is punched by means of the cutting inset 82 shown in FIGS. 6 and 7. The lightproof intermediate layer consisting of cardboard 68 is punched as well. The cutting inset 82 comprising the cutting knifes 86 mounted to a plate 84 and surrounded by a rubber layer 88 is constructed such that seven inserts of a size of 78×28 mm can be simultaneously punched out of a biofilm with the dimensions 258×124 mm or a cardboard with the same dimensions. In the middle of the longitudinal side, the cut parts are provided with two cuts of a length of 13 mm each, so that a web of 2 mm is left in the center. At a narrow side, the edges are rounded. The biofilm insert and the web-like material of the double-wall element 68 are folded about the central web and pushed into each other such that the calibrating zone of the biofilm insert is embraced by the double-wall element 68 on both sides.

Subsequently, the filter combination is assembled. The filter combination, e.g., consists of a polyester sheet (40×13 mm) as a cut-off filter 48 extending over three measuring fields, a layer of polyamide gauze (28×27 mm) extending over four measuring fields, and a further layer of polyamide gauze (28×15 mm) tending over two measuring fields, whose fabric direction extends diagonally to the first layer. Then, the filter combination 52 is welded at a broadedge with a commercial welding apparatus.

In order to assemble the dosimeter stack 20, the filter combination 52 is laid onto the measuring zone 62 of the biofilm insert. Both layers are held together by means of a photo-corner and laid between two layers of a protective polyester sheet 42,76. The protective sheet 42,76 is welded at all four edges close to the insert. A label for numbering is adhered to the underside of the dosimeter stack 20. The dosimeter stack 20 is stored in the dark at room temperature until it is used. It can be stored for one year without any change of the dosimetric characteristics occurring.

Finally, the dosimeter stack 20 is laid into the dosimeter bottom 16, the number label of the stack 20 appearing in the window of the bottom. Then, the dosimeter cover 14 with the measuring field mask 22 is placed thereunto such that the noses of cover 14 and bottom 16 engage into each other and snap in when being pressed together. In order to exchange the dosimeter stack 20, the cover 14 can be lifted off the bottom 16 by means of a screw driver.

The reception of personal biologically weighted UV measuring data is performed in that the biological UV dosimeter equipped with the dosimeter stack 20 is freely worn by the experimentee over a certain spot on the body for a certain period of time, e.g. one or several days. Thereafter, the dosimeter stack 20 is removed, the protective sheet 42,76 cut open and the biofilm insert taken out. The calibration of the calibrating zone 64 of the biofilm insert 60 is performed in a calibrating means by means of a mercury low-pressure burner at a wavelength of 254 nm either prior to or after the exposure. The calibrating means includes six calibration fields (10×10 mm) covered by neutral filters of different defined transmission. During the calibration of the biofilm insert 60, the measuring zone is obscured.

For development, the exposed and calibrated biofilm insert 60 is incubated in a nutrient solution at 33° C. for five to six hours while being slightly moved, subsequently rinsed with water and dried in a warm airflow. The created biomass is stained in a Coommassie dye solution at room temperature for two hours. Thereafter, the non-bound dye is removed in a desraining solution in two wash steps of a duration of 30 minutes each. After being washed in methanol, the stained biofilm insert 60 is dried in the warm airflow. The evaluation is performed by means of a computer-aided image analysis method. By means of the calibrating data, the measured values are allocated to a biologically weighted UV radiation indicated in the SI units $J/m^2$.

We claim:

1. An ultraviolet radiation dosimeter comprising an ultraviolet radiation sensor arranged in a dosimeter casing and including at least one measuring field and a calibrating zone, wherein the calibrating zone of the sensor is inserted in an ultraviolet radiation-shielded clearance of a double-wall element formed by folding an ultraviolet radiation-proof weblike material.

2. The ultraviolet radiation dosimeter according to claim 1, wherein the web-like material is folded transversely to its longitudinal extension.

3. The ultraviolet radiation dosimeter according to claim 2, wherein the web-like material comprises one folding edge only.

4. The ultraviolet radiation dosimeter according to claim 1, wherein the double-wall element comprises an upper wall and a lower wall arranged substantially in parallel to each other.

5. The ultraviolet radiation dosimeter according to claim 1, wherein the sensor is formed of film material comprising a web-like support layer coated with a ultraviolet radiation-sensitive material, the ultraviolet radiation-sensitive material extending over the entire region of the at least one measuring field and the calibrating zone.

6. The ultraviolet radiation dosimeter according to claim 5, wherein the film material of the sensor is folded transversely to its longitudinal extension.

7. The ultraviolet radiation dosimeter according to claim 6, wherein the film material comprises one folding edge only.

8. The ultraviolet radiation dosimeter according to claim 6, wherein the sensor and the double-wall element are pushed into each other such that the upper and the lower wall of the double-wall element as well as the at least one measuring field and the calibrating zone overlay each other, and wherein the folding edge of the sensor is located in the region of the free edges of the double-wall element and the folding edge of the double-wall element is located in the region of the free edges of the sensor, the at least one measuring field being arranged outside the double wall element and so as to be exposed to ultraviolet radiation.

9. The ultraviolet radiation dosimeter according to claim 5, wherein the at least one measuring field and the calibrating zone are arranged in two parallel planes so as to overlap each other.

10. The ultraviolet radiation dosimeter according to claim 1, wherein the sensor is formed of film material and wherein the web-like material and/or the film material comprise lateral cuts in the course of the folding edge which extend transversely to a longitudinal extension, so that, in the folded state, the upper and the lower wall of the double-wall element or the at least one measuring field and the calibrating zone, respectively, are connected by a web only.

11. The ultraviolet radiation dosimeter according to claim 1, wherein the web-like material of the double-wall element is cardboard or a plastic sheet.

12. The ultraviolet radiation dosimeter according to claim 1, wherein the outer dosimeter casing is a rigid dosimeter housing made of plastic.

13. The ultraviolet radiation dosimeter according to claim 1, wherein the outer dosimeter casing comprises a flexible sheet.

14. The ultraviolet radiation dosimeter according to claim 1, wherein the sensor comprises at least two measuring fields one of which is covered by an intensity filter or a wavelength filter.

15. The ultraviolet radiation dosimeter according to claim 14, wherein the intensity filter comprises fine-meshed gauze.

16. The ultraviolet radiation dosimeter according to claim 1, wherein the at least one measuring field is covered by an epidermis-analogous filter.

17. The ultraviolet radiation dosimeter according to claim 1, wherein a measuring field mask limiting the at least one measuring field(s) is arranged so as to cover the sensor.

18. The ultraviolet radiation dosimeter according to claim 1, wherein the sensor is a UV-sensitive film with immobilized microorganisms measuring the incident ultraviolet radiation in a biologically weighing manner.

19. The ultraviolet radiation dosimeter according to claim 1, wherein filters are provided, and the sensor and the filters form a dosimeter stack loosely laid into the dosimeter casing.

* * * * *